(12) United States Patent
DeLine et al.

(10) Patent No.: US 6,243,003 B1
(45) Date of Patent: Jun. 5, 2001

(54) ACCESSORY MODULE FOR VEHICLE

(75) Inventors: Jonathan E. DeLine; Niall R. Lynam; Ralph A. Spooner, all of Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/382,720

(22) Filed: Aug. 25, 1999

(51) Int. Cl.[7] .............................. B60Q 1/00; H04R 29/00
(52) U.S. Cl. ......................... 340/425.5; 381/56; 381/86; 381/169; 381/361; 381/365
(58) Field of Search ........................... 340/815.4, 425.5; 381/86, 361, 56, 110, 26, 365, 122, 168, 169; 455/74.1, 569, 567, 566, 568, 575, 90, 99, 100; 379/454, 446

(56) References Cited

U.S. PATENT DOCUMENTS

| | | | |
|---|---|---|---|
| D. 391,214 | 2/1998 | Hook et al. ......................... D12/187 |
| 4,646,210 | 2/1987 | Skogler et al. ...................... 362/142 |
| 4,733,336 | 3/1988 | Skogler et al. ...................... 362/142 |
| 4,807,096 | 2/1989 | Skogler et al. ...................... 362/142 |
| 4,930,742 | 6/1990 | Schofield et al. .................. 248/475.1 |
| 4,973,844 | 11/1990 | O'Farrell et al. ...................... 250/341 |
| 4,993,674 | * 2/1991 | Van Hout et al. .................... 248/229 |
| 5,576,687 | 11/1996 | Blank et al. .......................... 340/438 |
| 5,584,052 | * 12/1996 | Gulau et al. ............................ 455/90 |
| 5,615,857 | 4/1997 | Hook .................................... 248/549 |
| 5,669,698 | 9/1997 | Veldman et al. ..................... 362/83.1 |
| 5,708,410 | 1/1998 | Blank et al. .......................... 340/438 |
| 5,940,503 | 8/1999 | Palett et al. ........................... 379/454 |

* cited by examiner

*Primary Examiner*—Donnie L. Crosland
(74) *Attorney, Agent, or Firm*—Van Dyke, Gardner, Linn & Burkhart, LLP (57) ABSTRACT

An accessory module for use with a vehicular cellular telephone, emergency communication device, or other audio device, may be mounted to an interior surface of a vehicle windshield. The accessory module houses a microphone and may be positioned adjacent to a headliner of the vehicle generally above an interior rearview mirror which is supported therebelow. The accessory module provides a fixed orientation of the microphone and is easily installed to the vehicle as it is manufactured or as an aftermarket device. The accessory module may further include a wire cover, which extends to a mounting for the mirror in order to substantially encase a mirror wire harness, thereby retaining the mirror harness and providing a finished appearance to the mirror and accessory module.

65 Claims, 4 Drawing Sheets

ACCESSORY MODULE FOR VEHICLE

BACKGROUND OF THE INVENTION

The present invention relates generally to an accessory module for vehicles and, more particularly, to an accessory module for mounting a microphone for use in receiving an audio signal within a vehicle.

Many vehicles today use hands-free cellular telephones or other communication devices to avoid problems which may arise when a driver of a vehicle has to hold a telephone while driving the vehicle. These hand-free devices include a microphone to receive an audio signal from within the vehicle. It is known to include directional or polar microphones in these devices, which constrain the area covered by the microphone to an area where voices would typically originate, such as a driver's head area. In certain applications, these microphones are implemented in an interior rearview mirror, such that the microphone is positioned in front of the driver and at approximately the same level as the head of the driver. However, the location of the mirror may be at a distance which is beyond the optimal operative range of the microphone, due to the forward slant of the windshield away from the driver and the location at which the mirror is mounted thereto. Furthermore, rearview mirrors are adjustable to account for different sized drivers, which may result in the microphone being directed away from the head of the driver or other occupants, and thus receiving other noises from within the cabin of the vehicle.

An additional issue with known mirror-mounted microphones (such as interior rearview mirror assemblies with a microphone located within the movable mirror housing and/or the mirror mounting bracket, such as a header mounting bracket) is that typically, audio or communication devices in vehicles are optional. Accordingly, separate mirror housings and wiring bundles or harnesses are required to accommodate the standard mirror and the optional mirror which includes the microphone or other accessories such as a vehicle alarm status indicator. This leads to a proliferation of parts within the vehicle assembly plants, which further results in increased costs to the vehicle.

Many vehicles which offer hands-free communication devices mount the microphones in a headliner console rearward of the windshield and along the ceiling of the interior cabin of the vehicle. By mounting the microphones in the headliner console, the microphones may be in a substantially fixed position and directed toward the driver head area within the vehicle. However, this positions the microphone substantially above the driver where it may not optimally pick up the voice signal of the driver, since the driver's voice is directed generally forwardly while the driver continues to view the roadway, while the microphone is directed generally downwardly from the ceiling. Furthermore, locating the microphones in a headliner console adds to the vehicle costs, due to additional installation processes and more costly parts, such as additional ceiling trim, console components and the like. Also, locating the microphone in a headliner console fails to avoid the requirement of at least two separate headliner consoles to accommodate the optional microphone verses a console without the microphone.

Therefore, there is a need in the art for a microphone which may be mounted generally forwardly of the driver of the vehicle, and fixedly mounted to maintain proper orientation with respect to the driver of the vehicle.

SUMMARY OF THE INVENTION

The present invention is intended to provide an accessory module which preferably mounts along an upper, inner edge of the windshield of a vehicle to direct a microphone, and preferably a polar or directional microphone, generally downwardly and rearwardly toward the driver of the vehicle. The accessory module is adaptable for use on a vehicle with a rearview mirror which is separately mounted on the interior surface of the windshield such as a button mounted rearview mirror, and may further include a wire cover extending downwardly from the module to the mounting button of the rearview mirror. The wire cover functions to cover any mirror wiring harness which may connect the rearview mirror assembly to a vehicle wiring harness, typically within the headliner of the vehicle.

According to an aspect of the present invention, an accessory module comprises at least one microphone for receiving audio signals from within a cabin of a vehicle and a housing for mounting the microphone. The vehicle includes a windshield, an interior rearview mirror mounted to an interior surface of the windshield, and a headliner extending along an upper edge of the windshield. The housing for the microphone is preferably mountable between the headliner and the rearview mirror. The microphone of the accessory module (and any other accessory housed within the accessory module) is electronically connectable to a vehicle wiring within the headliner. Preferably, accessories, such as the microphone, are detachable connectable to the vehicle wiring, such as by a plug and socket connector (for example, a multi-pin electrical plug and socket connector system), so that the module can be optionally installed to the vehicle with ease. This is particularly advantageous in circumstances when the interior mirror is a non-electrical mirror, such as a base prismatic mirror.

In one form, the rearview mirror is electronically connected to the vehicle wiring harness. Preferably, the microphone module further includes a wire cover to encase a wire harness between the rearview mirror and the microphone module. More preferably, both the microphone and mirror are connectable with the vehicle wiring in the headliner.

According to another aspect of the present invention, an accessory module for a vehicle comprises at least one microphone for receiving audio signals from within a cabin of the vehicle, a microphone housing for mounting the microphone, and an interior rearview mirror assembly. The vehicle includes a windshield and a headliner extending along an upper, inner edge of the windshield. The microphone is electronically connectable to a vehicle wiring harness within the headliner. The microphone housing is mountable to the windshield adjacent to the headliner. The mirror assembly includes a mirror wire harness and a mirror housing. The mirror wire harness is electronically connectable to the vehicle wiring harness in the headliner.

In one form, the mirror assembly further includes a mounting button for mounting the mirror assembly to an interior surface of the windshield. The mounting button may be interconnected to the microphone housing via a wire cover extending between the microphone housing and the mounting button and at least partially encasing the mirror wire harness and/or the mounting button itself.

In another form, the microphone housing includes a mirror mounting arm which extends generally downwardly therefrom. The mirror housing is pivotally interconnected to a lower end of the mounting arm. The mirror wire harness is at least partially encased within the mounting arm.

Accordingly, the present invention provides a microphone module for installation of a microphone for use with an audio system, such as a hands-free cellular telephone, audio recording device, emergency communication device or the like. The accessory module containing the microphone is preferably mounted above the mirror between the mirror and the headliner of the vehicle, which provides a fixed location of the microphone for maintaining proper orientation of the microphone with respect to the vehicle interior. Because the microphone module is a separate component from the mirror and headliner, additional mirror or headliner console components for mounting the microphone are not required. The present invention facilitates fewer parts in the assembly plant since the headliner and mirror assembly may be the same part regardless of whether the audio or communication device associated with the invention is to be installed within the vehicle. Furthermore, because the microphone module does not require special headliners or mirrors, the microphone module may be easily installed as an aftermarket device.

These and other objects, advantages, purposes and features of this invention will become apparent upon review of the following specification in conjunction with the drawings.

DESCRIPTION OF THE PREFERRED EMBODIMENTS

Figure 1:
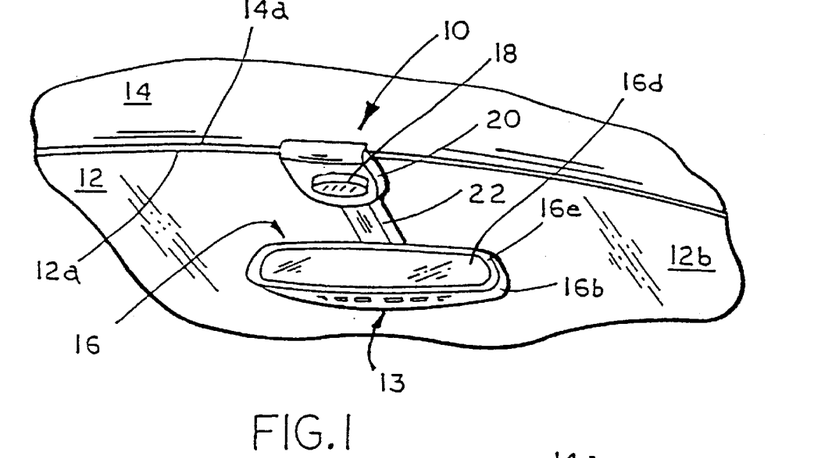
FIG. 1 is a perspective view of the microphone module of the present invention.

Referring now specifically to the drawings, and the illustrative embodiments depicted therein, a microphone module 10 is mounted adjacent to a vehicle windshield 12, as shown in FIG. 1. Microphone module 10 may be implemented in the vehicle in association with a cellular telephone, a recording device, such as a dictation system, an emergency communication device, such as the ONSTAR system commercially available in certain General Motors vehicles, or any other audio device which may include a microphone or audio receiving device. Preferably, the manually actuated buttons to operate the ONSTAR system are mounted at a movable housing 16b of an interior rear view mirror assembly 16, such as is shown generally at 13 in FIG. 1. The vehicle includes a headliner 14, which at least partially covers the ceiling of an interior passenger compartment of the vehicle and has a forward edge 14a which interfaces with an upper edge 12a of windshield 12. An interior rearview mirror assembly 16 may be mounted to an interior surface 12b of windshield 12, typically at a position spaced downwardly from upper edge 12a and the position of module 10. Microphone module 10 includes at least one microphone 18 which is fixedly secured within a microphone housing 20 and is directed toward an area generally defined by the location of a head of a typical driver of the vehicle. Microphone module 10 may further include a wire cover 22 which extends downwardly between housing 20 and mirror assembly 16 to encase or cover a mirror wire harness 24, which may be included in mirror assembly 16 to provide power or control signals to components or accessories which may be mounted within or associated with mirror assembly 16.

Figure 2:
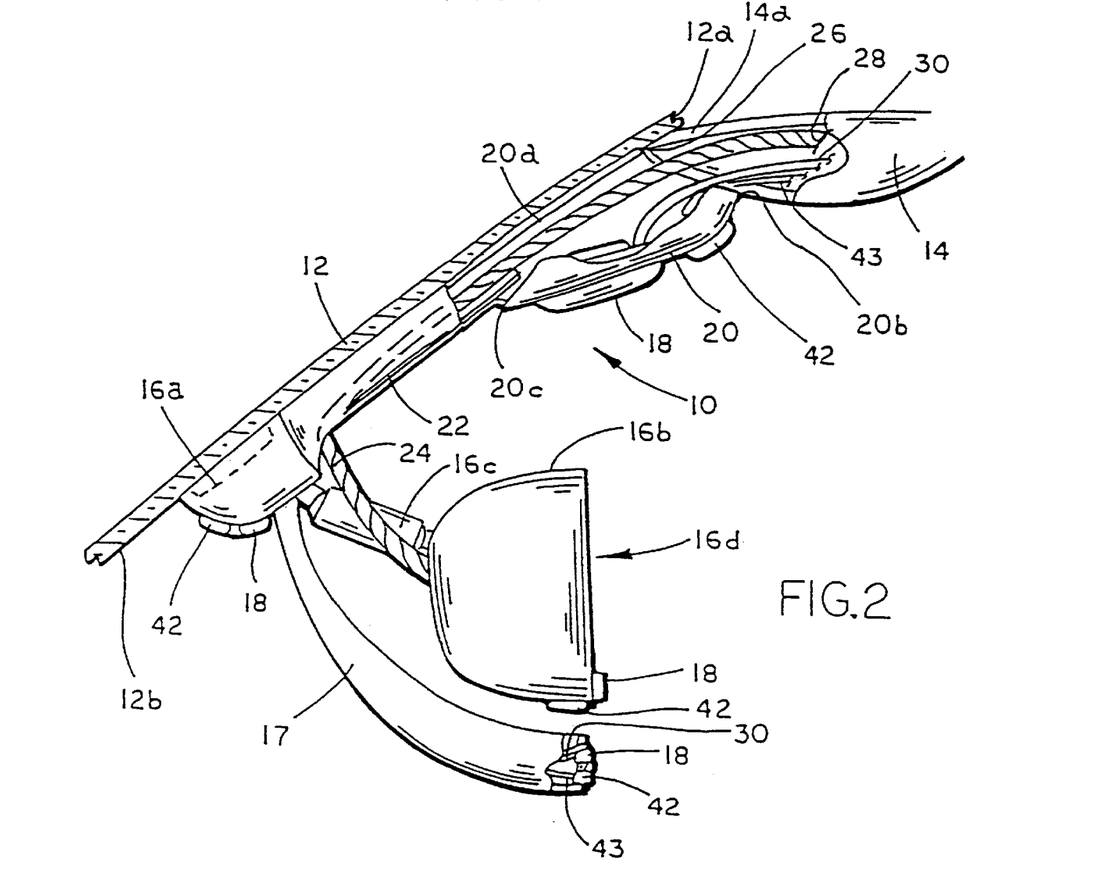
FIG. 2 is a side elevation shown partially in section of the microphone module in FIG. 1.
Figure 3:
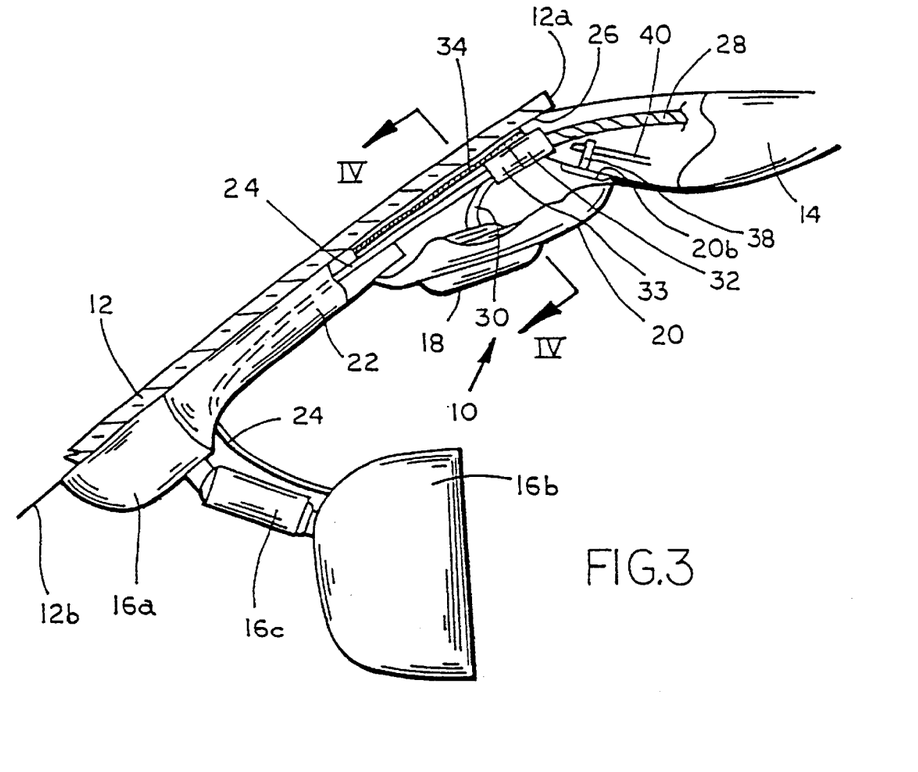
FIG. 3 is a similar side elevation as that in FIG. 2, showing an alternate electrical connection and mounting bracket for the microphone module.

As shown in FIG. 2, mirror assembly 16 may include a conventional mounting button 16a and a mirror housing 16b supporting a prismatic, electro-optic or electrochromic reflective element. Mounting button 16a is adhesively secured to interior surface 12b of windshield 12 at a location substantially below forward edge 14a of headliner 14 and upper edge 12a of windshield 12, as is known in the art. Mirror housing 16b is pivotally mounted to mounting button 16a via an arm 16c, which is pivotally interconnected to button 16a or housing 16b, or both. Mirror housing 16b encases a reflector 16d (FIG. 7) for reflecting an image of a scene generally rearwardly of the vehicle to the driver (and with the mirror housing being adjustable by the driver), and a bezel 16e which retains reflector 16d in housing 16b, as is well known in the art. Mirror wire harness 24 extends generally upwardly from mirror housing 16b to headliner 14 for electrical connection with a vehicle wiring harness 28 (FIG. 3). Mirror wire harness 24 provides electrical power and/or control signals to the mirror assembly 16 or various mirror mounted accessories within assembly 16, such as power for electro-optic/electrochromic mirrors, interior lights (such as map lights in the mirror housing), and displays such as for compass headings, temperatures, passenger airbag status, or the like.

Headliner 14 extends along upper edge 12a of windshield 12 and may be a plastic trim panel to secure a fabric ceiling cover and provide an aesthetically pleasing finish between the windshield and the fabric ceiling cover of the vehicle. Alternately, headliner 14 may be a forward portion of the fabric cover or a ceiling console. Headliner 14 may further include other trim or headliner console components (not shown), for storing various articles, such as sunglasses, garage door openers or the like or for housing other components or accessories associated with the vehicle.

Preferably, microphone module 10 includes wire cover 22 (FIGS. 1 and 2), which extends between a lower edge 20c of housing 20 and mounting button 16a of mirror 16. Mirror harness 24 is encased within wire cover 22 to retain harness 24 and provide a finished appearance to the electrical connection of mirror 16 to vehicle wiring harness 28. Preferably, wire cover 22 is telescopingly extendable and retractable to adapt the length to different mounting locations of mounting button 16a relative to headliner 14 on various vehicles. As best shown in FIG. 2, wire cover 22 may extend or retract by sliding upwardly or downwardly within housing 20. This facilitates implementation of microphone module 10 in various vehicles and further facilitates the aftermarket installation of module 10 in vehicles having a button-mounted interior rearview mirror.

Microphone module 10 is preferably secured to interior surface 12b of windshield 12 at an interface junction 26 between forward edge 14a of headliner 14 and interior surface 12a of windshield 12. However, it is envisioned that microphone module 10 may be mounted in other locations. Housing 20 of microphone module 10 is preferably formed with a substantially flat windshield mounting surface 20a and a curved, concave headliner surface 20b, such that housing 20 mounts to windshield 12 along mounting surface 20a, while headliner surface 20b substantially uniformly engages headliner 14 to provide a flush, finished transition between microphone module 10 and headliner 14. Preferably, housing 20 is adhesively secured to interior surface 12b of windshield 12, such as by bonding, pressuring sensitive adhesives, anaerobic adhesives, double faced tape, or the like. However, microphone module 10 may optionally be mechanically secured to an intermediate mounting bracket adhered to the windshield, or may be connected to the headliner itself, as discussed below, without affecting the scope of the present invention. Microphone module 10 is preferably a plastic molded part, which facilitates forming the part in various shapes to match the headliner/windshield interface and to further facilitate providing the part in different colors to match optional interior colors of the vehicles.

Figure 7:
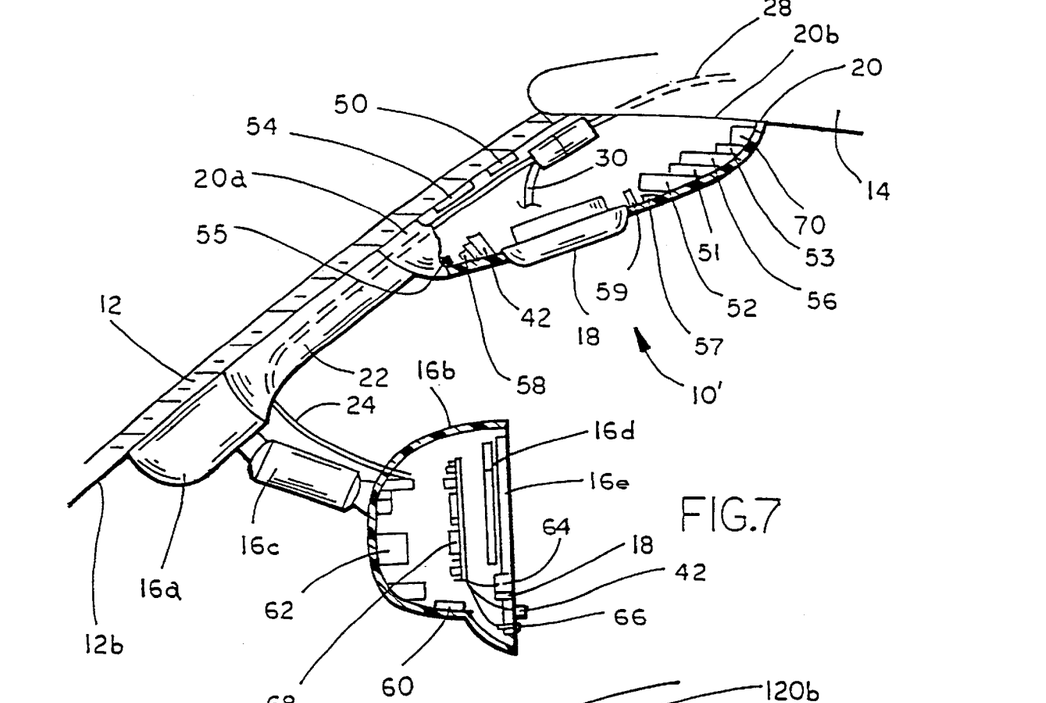
FIG. 7 is a side elevation shown partially in section of a microphone module and mirror housing having various electrical and/or electronic components therein.

Mirror harness 24 may connect directly to vehicle wiring 28 while an accessory wiring harness 30 may separately connect to the vehicle wiring to provide power and/or control signals to the accessories within accessory module 10. Alternately, mirror harness 24 may connect to module 10, which may then be connectable to vehicle wiring 28, as shown in FIGS. 3 and 7. Because microphone module 10 may be a separate module from the headliner and the mirror assembly, and because module 10 is preferably connected to the vehicle wiring independent of wires from the interior rear view mirror assembly to the vehicle wiring, microphone module 10 may be easily removed or accessed for serviceability or replacement without having to remove or replace the mirror assembly. This is a significant advantage over the prior art because if the microphone is damaged, the more expensive components, such as the mirror or headliner console, do not have to be replaced in order to repair or replace the microphone.

Microphone module 10 is mounted to windshield 12 such that microphone 18 is directed downwardly and rearwardly toward the driver's seat of the vehicle to optimally receive audio signals therefrom. Preferably, microphone 18 is a directional or polar microphone, which limits the audio signal received to signals within the area toward which the microphone is directed. Such microphones are known in the art and are commercially available as an AKG 400 Series or a 501T Series microphone from A.K.G. Acoustics/GMBH in Vienna, Austria. These microphones are operable to receive audio signals from within the targeted area, while substantially reducing or limiting the signals received from outside that area. By mounting microphone 18 within housing 20 and directing microphone 18 downward and rearward toward a typical location of a driver's head, the audio signal detected by microphone 18 will be dominated by a voice signal from the driver of the vehicle and will substantially limit noise signals originating from other sources, such as the engine, road, wind, HVAC, radio, turn signals and the like. Because microphone 18 is fixedly mounted within housing 20, microphone 18 may be optimally directed toward the area of interest, and will not be adjusted or misdirected when the mirror is adjusted for a different driver of the vehicle.

Alternately, multiple microphones may be implemented within microphone module 10 to receive various signals from different directions. As is known in the audio art, RMF techniques may be implemented to digitize individual outputs from the multiple microphones and integrate the outputs to establish which outputs are the loudest and which have the presence of human audible signals verses noise. The signals which have the greatest presence of human audible signals may then be selected over the signals of the other microphones, thereby providing a voice signal to the communication device.

Microphone module 10 further includes a microphone wire harness 30 (FIG. 3), which extends from microphone 18 through headliner surface 20b of housing 20 and into headliner 14. Microphone 18 is preferably interconnectable to the vehicle harness by microphone harness 30 in a conventional manner. Preferably, microphone harness 30 comprises a pair of wires for microphone 18. Clearly, however, if multiple microphones are implemented in microphone module 10, multiple wires (not shown) will correspondingly be required.

As shown in FIG. 2, the audio system may further include a loud speaker 42 for providing an audible signal to the driver and passengers of the vehicle. Speaker 42 may be mounted to housing 20 and includes a wiring harness 43 for electrical connection to the vehicle wiring 28, similar to microphone 18. Speaker 42 may be a conventional diaphragm speaker, piezo-electric speaker, such as a piezo-electric ceramic speaker, or the like. Most preferably, speaker 42 is a piezo-electric ceramic moldable speaker. Additional speakers may be mounted within the accessory module 10 or in a pod 17 attached to the mirror mounting bracket 16a of the interior rear view mirror assembly.

It is further envisioned that the audio system may include multiple microphones and/or speakers positioned at different locations within the vehicle to supplement one another in order to optimally receive and project the audio signals from and to the desired areas within the vehicle. For example, as shown in FIG. 2, one or more microphones 18 and/or speakers 42 may be positioned in module 10, as well as in mirror housing 16b, in mounting button 16a, and/or within a pod 17, which may be mounted to mirror assembly 16 and extends downwardly beneath mirror housing 16b. Clearly, pod 17 may alternately be positioned above or to either side of mirror housing 16b, without affecting the scope of the present invention. The microphone 18 and speaker 42 may access and/or share the electronic circuitry of an electro-optic or electrochromic mirror. By providing one or more microphones and speakers within the vehicle, the overall effectiveness of the audio system may be improved, since signals not optimally directed toward the microphone within the module, may be better received by the microphone in the pod, mirror housing, or button.

Referring again to FIG. 3, microphone module 10 may alternately connect to the vehicle wiring harness 28 via electrical connectors 32 and 33. For example, a socket 33 may be provided in housing 20 of microphone module 10, such that vehicle wiring harness 28 may include a corresponding male connector, such as a conventional twelve pin connector, which mates with socket 33. Microphone harness 30 may then extend from socket 33 to microphone 18, while remaining within housing 20. Similarly, mirror harness 24 may extend from socket 33 downwardly through housing 20 and wire cover 22 to mirror assembly 16. By connecting both the mirror harness 24 and microphone harness 30 to the vehicle harness 28 with connectors 32 and 33, microphone module 10 further facilitates simplified installation of mirror assembly 16 within the vehicle.

Figure 4:
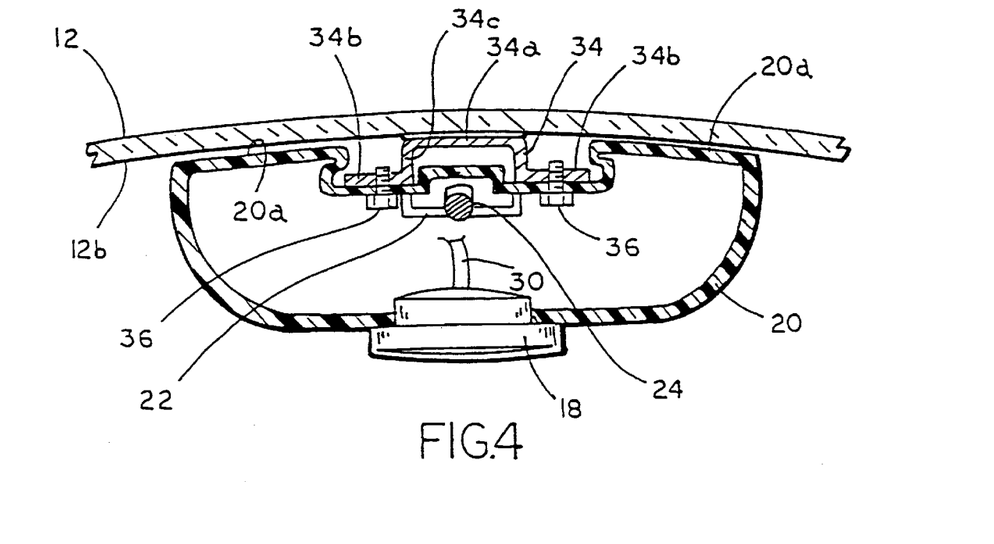
FIG. 4 is a sectional plan view of the microphone module taken along the line IV—IV in FIG. 3.

As shown in FIGS. 3 and 4, microphone module 10 may be mechanically secured to window 12 and/or headliner 14. For example, a bracket 34 may be bonded or otherwise adhesively secured to interior surface 12d of windshield 12. Window surface 20a of housing 20 may then be correspondingly formed with bracket 34 to engage the bracket for removable mounting of microphone module 10 to windshield 12. As best shown in FIG. 4, bracket 34 may include a windshield mounting surface 34a and a pair of mounting flanges 34b which are offset from the position of mounting surface 34a and extend laterally outwardly from a pair of sidewalls 34c, which extend downwardly and rearwardly from mounting portion 34a. Windshield surface 20a of housing 20 may then be correspondingly formed to slidably engage mounting flanges 34b of bracket 34, such that housing 20 is slidable upwardly along bracket 34 until headliner surface 20b interfaces with headliner 14. At that point, one or more mounting pins or fasteners 36 may be inserted through housing 20 and mounting flanges 34b to substantially secure the components together. Alternatively, or in addition to fasteners 36, a headliner fastener 38 (FIG. 3) may extend through headliner surface 20b of housing 20 and engage a bracket 40 within headliner 14, thereby substantially securing housing 20 to both windshield 12 and headliner 14. Mounting fasteners 36 and 38 may be threaded fasteners or push-pin or snap fit type fasteners, to substantially secure housing 20 to the respective brackets 34 and 40. It is further envisioned that the mounting bracket and microphone housing may be correspondingly formed to press-fit together or snap or otherwise lock together as the microphone housing is moved to the appropriate mounting location relative to the bracket. Clearly, other mounting brackets and/or fasteners may be implemented to substantially secure microphone module 10 relative to windshield 12 or headliner 14, without affecting the scope of the present invention.

Figure 5:
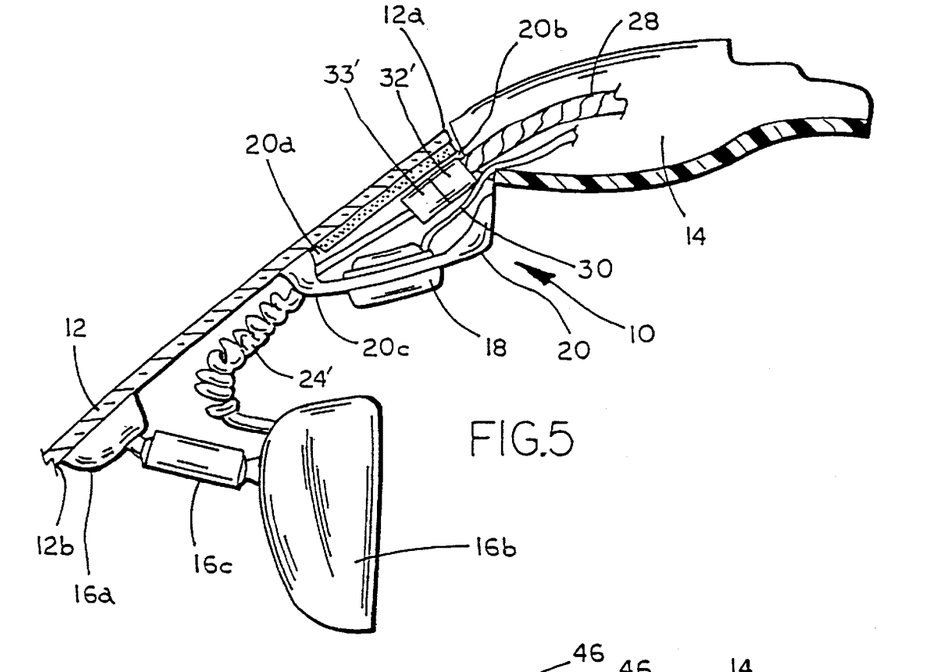
FIG. 5 is a similar side elevation as that in FIG. 2, showing a microphone module without a wire cover but including a self-coiling wire harness.

Referring now to FIG. 5, microphone module 10 may be implemented without a wire cover. The mirror wiring harness may extend freely downwardly from microphone housing 20 to mirror housing 16b or may be adhered or otherwise secured or guided along interior surface 12b of windshield 12 and further along arm 16c to mirror housing 16b. Alternately, as shown in FIG. 5, a mirror harness 24' may be implemented to provide an aesthetically pleasing spirally-coiled cord, similar to a conventional telephone cord, which extends downwardly from lower end 20c of housing 20 and curves rearwardly toward housing 16b of mirror assembly 16. Mirror harness 24' may be electronically connectable with vehicle wiring harness 28 via conventional electrical connectors 32' and 33', while microphone harness 30 is electronically connected with the vehicle wiring harness separately, as discussed above with reference to FIG. 2. Clearly, however, mirror harness 24' and microphone harness 30 may be connectable to vehicle wiring harness 28 by any other conventional means, without affecting the scope of the present invention. As discussed above with reference to FIGS. 2 and 3, housing 20 may be bonded to, adhesively secured or mechanically fastened to interior surface 12b of windshield 12 and/or to headliner 14.

Although specific embodiments of the microphone module of the present invention are shown in FIGS. 2 through 5 and discussed above, clearly the scope of the present invention includes other means of mounting the microphone module and of covering or guiding the mirror harness between the microphone module and the mirror. For example, the microphone module may be mounted to the windshield between mounting button 16a and headliner 14 and have wire covers or the like extending from both upper and lower ends of the module to cover wires between the headliner and the module and further between the module and the mirror assembly. Alternatively, the microphone module may be mounted above and adjacent to the mirror mounting button 16a and include a wire cover which extends upwardly therefrom to substantially encase the wires extending from the module to the headliner for connection with the vehicle wiring harness. It is further envisioned that the microphone module may be part of a plastic wire cover extending upwardly from the interior rear view mirror assembly toward the headliner. The wiring harnesses associated with the mirror assembly and the microphone may be routed and connected with the vehicle wiring harness by any known means without effecting the scope of the present invention. The microphone and mirror assemblies may be implemented as a single component, which requires fewer assembly plant installation processes, thereby reducing the costs associated with the vehicle manufacture.

Figure 8:
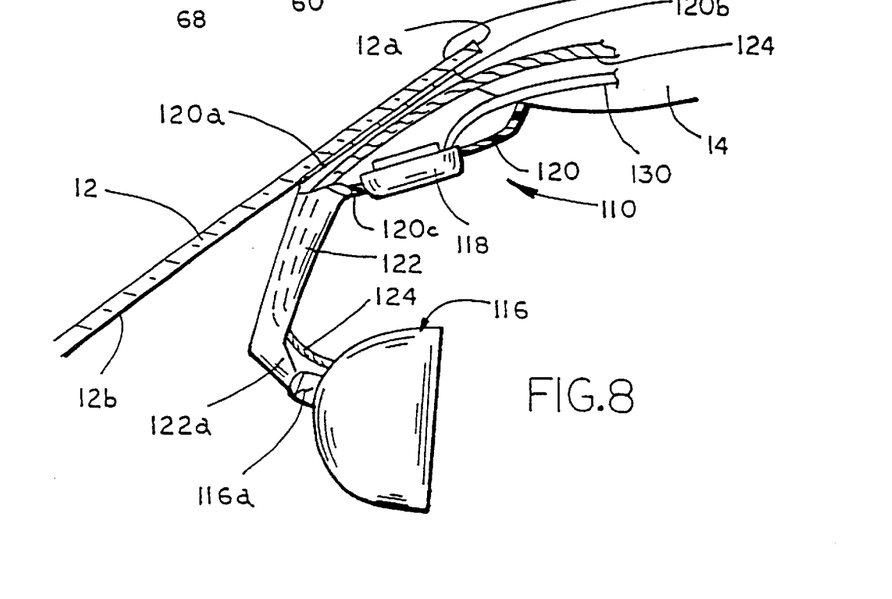
FIG. 8 is a similar side elevation as that in FIG. 2 of an alternate embodiment of the present invention, having a rearview mirror mounted to an arm extending downwardly from the microphone module.

Although shown and described above as being implemented with a button mounted interior rearview mirror assembly, an alternate embodiment of the present invention may incorporate a mirror assembly 116 with a microphone module 110, as shown in FIG. 8. Microphone module 110 preferably includes a microphone 118 and a microphone housing 120, which are substantially similar to microphone 18 and housing 20, discussed above with respect to microphone module 10. However, microphone module 110 further includes a mirror mounting arm 122, which extends generally downwardly from a lower portion 120c of housing 120. Mirror assembly 116 is pivotally mounted to a lower end 122a of arm 122 via a conventional ball and socket connection 116a. A mirror wiring harness 124 extends from mirror assembly 116 upwardly through arm 122 and further through housing 120 and into header 14 of the vehicle for electrical connection with the vehicle wiring harness. A microphone harness 130 may also electronically connect microphone 118 with the vehicle wiring harness, as discussed above with respect to microphone harness 30. Microphone module 110 and mirror assembly 116 may be electronically connected to the vehicle wiring harness by any known means, without affecting the scope of the present invention. Similar to microphone module 10, a windshield surface 120a of housing 120 may be adhesively or mechanically secured along an interior surface 12b of windshield 12.

Figure 6:
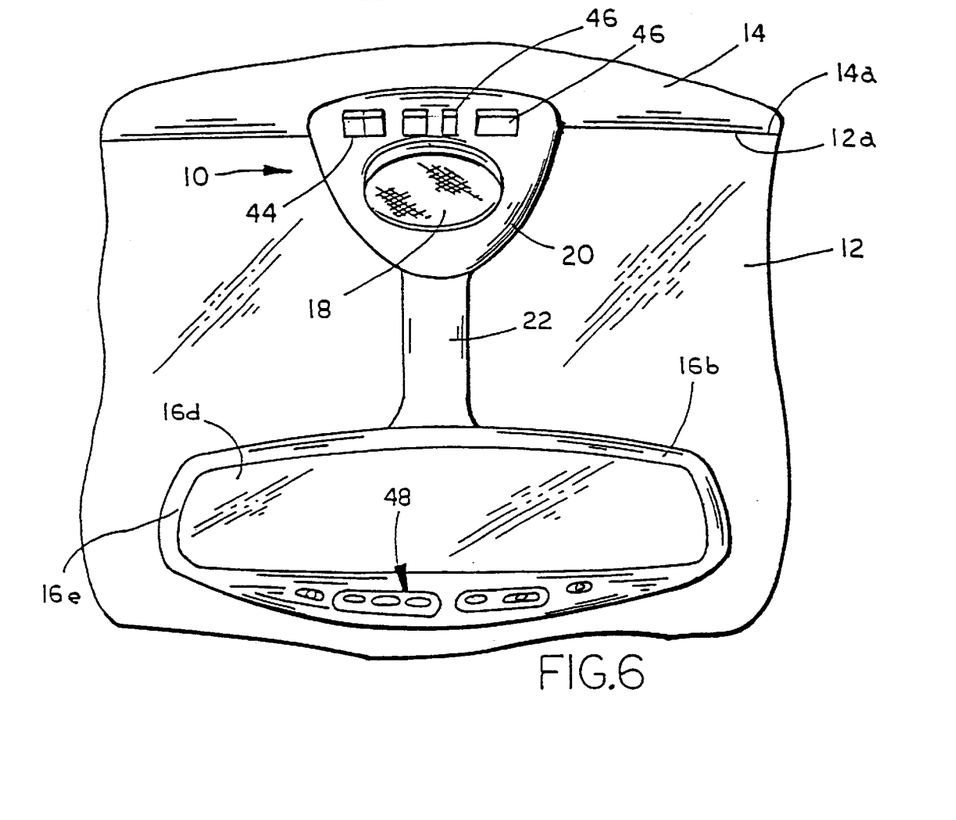
FIG. 6 is an elevation looking forwardly in a vehicle cabin of a microphone module and mirror housing having controls mounted thereon.

As shown in FIG. 6, microphone module 10 may further include manual controls for the audio or communication device associated with microphone 18, such as buttons 44 for activating and/or adjusting the communication device. Microphone module 10 may further include other manual controls 46 for activating or adjusting other accessories or devices within the vehicle, such as interior or exterior lights, or for selecting a function for microphone 18, such as a cellular phone verses an emergency communication device or recording device. Mirror housing 16b may also include controls, buttons or switches, shown generally at 48, for selectively activating, deactivating or adjusting one or more accessories associated with the vehicle. For example, controls 48 may activate map reading lights on mirror housing 16b, temperature displays, compass heading displays or the like, which may be displayed on a portion of mirror housing 16b and are thus easily visible to the driver of the vehicle. Alternatively, however, controls 46 and 48 on microphone module 10 and mirror housing 16b, respectively, may control accessories or lights which are located on or within the vehicle and yet are remote from microphone module 10 and mirror 16.

Referring now to FIG. 7, an accessory module 10' may further include multiple accessories, components or devices associated with various control systems of the vehicle and connected with a vehicle control or the vehicle wiring harness. For example, accessory module 10' may include a loudspeaker 42, a Global Positioning System (GPS) antenna 50, a motion sensor 52, a rain sensor 54, a video device or camera 56, an interior light 58, an automatic toll booth transducer 59, a security system status indicator 70, a compass and/or compass sensor 51, a temperature display and/or temperature sensor 53, a tire pressure indicator display 55, a seat occupancy detection antenna and/or transducer 57, and/or any other devices, components or circuitry which may be useful to mount in accessory module 10'. Preferably, camera 56 is a pixelated imaging array sensor, such as a CMOS imaging array or the like, a description of which is disclosed in commonly assigned U.S. Pat. 5,670,935, issued to Schofield et al., the disclosure of which is hereby incorporated herein by reference. The module 10' may provide a location for these devices which is highly visible and eases user interface by the driver or passengers of the vehicle. Furthermore, mirror housing 16b may also include electrical devices and electronic components, such as other microphones 18 and loudspeakers 42, map reading lights 60, compass 62, display 64, trip computer 66, or other components or devices associated with the vehicle. Mirror harness 24 may provide power and/or control signals to these components or devices and may interconnect with the control circuitry of the devices and of an electrochromic mirror function control circuitry 68 for electronically adjusting the reflectivity of reflector 16d within mirror housing 16b. Display 64 may display vehicle status or information displays, such as compass headings, interior or exterior temperatures, clock display, fuel level display, air bag status display, telephone dial information display, or other status displays of various components or devices associated with the vehicle. Information displayed in display 64 may be selectively displayed by an operator via controls 48 (FIG. 6), or may be cyclically displayed or may be displayed when there is a change in status of one of the devices.

It is envisioned that accessory module 10' may further include multiple electrical and/or electronic components, such as those described in commonly assigned, U.S. patent applications, Ser. No. 08/918,772, filed Aug. 25, 1997 by Deline et al., now U.S. Pat. No. 6,124,886, and Ser. No. 09/244,726, filed Feb. 5, 1999 by Deline et al., now U.S. Pat. No. 6,172,613, the disclosures of which are hereby incorporated herein by reference. The mirror and/or the microphone module may communicate with these or other devices or components within the vehicle as part of a Car Area Network (CAN) or multiplex system, such as is disclosed in commonly assigned U.S. Pat. No. 5,798,575, issued to O'Farrell et al., PCT International Application published Sep. 25, 1997 under International Publication No. WO 97/34780, by Fletcher et al., PCT International Application No. PCT/IE98/00001, filed Jan. 9, 1998 by John P. Drummond et al. and published Jul. 16, 1998 under International Publication Number WO 98/30415, the disclosures of which are hereby incorporated herein by reference, a Local Interconnect Network (LIN), or similar communications protocols, which may support the control of mechatronic nodes in automotive distributor applications.

Accessory module 10' may also include an illumination source 70 for a vehicle security system, such as an intrusion detection system, vehicle alarm system, vehicle antitheft system, or the like. The illumination source may be an incandescent source or a nonincandescent source. Preferably, illumination source 70 is a nonincandescent, solid state source such as a light emitting diode (LED), an electro-luminescent device or the like. The illumination source 70 is operable to blink or flash intermittently when the system is armed. Typically, such systems flash the illumination source rapidly at first for up to approximately 30 seconds (or longer) after arming of the system, and then intermittently flash the illumination source for a continuous period while the system is activated (for example, once every one to two seconds), thereby alerting people within the vehicle that the security system is activated.

It is further envisioned that the illumination source for the vehicle security system may be included in a separate module or pod which may be mounted to the microphone or accessory module the mirror assembly, or the vehicle headliner. The illumination source module may be substantially similar to the microphone or accessory module discussed above and may clip or otherwise be mounted to the microphone module. For example, the illumination source module may snap into a mounting aperture in the microphone module or may be adhesively mounted to a side wall of the microphone housing. Alternately, the security system activation status source module may be mounted to the mirror assembly, such as to the mounting button, arm or mirror housing. The illumination source module may then be positioned below, above, or to either side of the mirror housing to facilitate viewing of the illumination source by passengers within the vehicle. The illumination source module may otherwise be mounted to the wire cover of the microphone module such that it is visible above the mirror housing. If the vehicle includes a header mounted mirror assembly, it is further envisioned that the illumination source module may be mounted to, or included as part of, the header mirror mounting bracketry or other mounting device.

By providing a vehicle security system illumination source module as a separate component, greater flexibility is achieved by the vehicle manufacturers. The separate security system module avoids the additional expenses required to tool two different mirror cases for vehicles with or without a security system. The optional pod or module with the illumination source may be simply installed as a vehicle option, or as an aftermarket device. Similar to the microphone and accessory modules discussed above, the illumination source module for the security system may further include other components, devices, controls or displays associated with the security system or other systems within the vehicle. It is further envisioned that other pods or modules which include one or more various components or devices associated with other systems or devices of the vehicle may be implemented to facilitate easy installation of the components of the systems either in the assembly plant or as aftermarket devices.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A microphone module for an audio system of a vehicle, the vehicle having a cabin, a windshield, an interior rearview mirror mounted to an interior surface of the windshield and a headliner extending along an upper edge of the windshield, said microphone module comprising:

a plurality of microphones comprising at least two microphones for receiving audio signals from within the cabin, said at least two microphones generating output signals indicative of sound generated within the vehicle cabin, said output signals being digitized and integrated in order to distinguish the presence of voice signals versus noise signals, said noise signals originating from at least one noise source selected from the croup consisting of engine noise, road noise, wind noise, HVAC noise, a radio, and a turn signal, at least one of said at least two microphones being directed toward an area encompassing the general location of a head of a driver of the vehicle.

2. The microphone module of claim 1, wherein said microphone module is fixedly secured such that at least two of said microphones are directed toward the area encompassing the general location of a head of a driver of the vehicle.

3. The microphone module of claim 1, including a control which is operable to integrate each of said output signals of said plurality of microphones in order to determine which of said plurality of microphones are receiving voice signals and which are receiving non-voice signals, said control at least partially filtering out the non-voice signals.

4. The microphone module of claim 1, wherein said at least one of said microphones is a single directional microphone fixedly secured within said module.

5. The microphone module of claim 1, wherein the mirror has at least one electronic accessory associated therewith and is electronically connected to the wiring of the vehicle via a mirror harness extending between the mirror and the headliner.

6. The microphone module of claim 5 further including a wire cover which extends between said module and the mirror said module being positioned remote from the mirror, the mirror harness being routed within said wire cover.

7. The microphone module of claim 5, wherein said microphone harness is connectable to the vehicle wiring via a connector.

8. The microphone module of claim 7, wherein the mirror harness is connectable to the vehicle wiring via said connector.

9. The microphone module of claim 5, wherein the mirror harness is connectable to the vehicle wiring via a connector.

10. The microphone module of claim 1, wherein said microphone harness is connectable to the vehicle wiring via a connector.

11. The microphone module of claim 10, wherein said module is removably attached to a mounting member on at least one of the windshield and the headliner.

12. The microphone module of claim 1, wherein said module is adhesively secured to the interior surface of the windshield.

13. The microphone module of claim 1, wherein said module is removably attached to a mounting member.

14. The microphone module of claim 13, wherein said mounting member is a bracket adhesively secured to the interior surface of the windshield.

15. The microphone module of claim 14, wherein said mounting member further includes a bracket secured in the headliner of the vehicle, said module being mountable to the windshield adjacent to the headliner.

16. The microphone module of claim 1, wherein said audio system is one of a cellular telephone, an emergency communication system and a voice recording system.

17. The microphone module of claim 16 further including control switches for said audio system on said module.

18. The microphone module of claim 16 further including control switches for said audio system on at least one of the mirror and said module.

19. The microphone module of claim 1, wherein said microphone module includes at least one of a Global Positioning System antenna, a motion sensor, a rain sensor, a video device, an interior light of the vehicle, an automatic toll booth transducer, a security system status indicator, a compass, a compass sensor, a temperature display, a temperature sensor, a tire pressure indicator display, a seat occupancy detection antenna, a seat occupancy detection transducer, and a loudspeaker.

20. A microphone module for an audio system of a vehicle, the vehicle having a cabin, a windshield, an interior rearview mirror assembly and a headliner extending along an upper edge of the windshield, the mirror assembly including a mounting member and a mirror housing pivotally interconnected to the mounting member, the mounting member being mounted to an interior surface of the windshield, the mirror assembly being electronically connectable to a vehicle wiring harness in the headliner via a mirror harness, said microphone module comprising:

a plurality of microphones for receiving audio signals from within the cabin, said plurality of microphones generating output signals indicative of sound generated within the vehicle cabin, said output signals being digitized and integrated in order to distinguish the presence of voice signals versus noise signals, said noise signals originating from at least one noise source selected from the group consisting of engine noise, road noise, wind noise, HVAC noise, a radio, and a turn signal;

a microphone housing for mounting said plurality of microphones, said microphone housing being mountable to the windshield at a location that is separate and distinct from the mirror assembly, said plurality of microphones being electronically connectable to the vehicle wiring harness within the headliner; and a wire cover which is adapted to substantially encase the mirror harness between the mirror mounting member and said microphone housing.

21. The microphone module of claim 20, wherein said wire cover is an adjustable wire cover extending along the windshield between said microphone housing and the mirror mounting member, said wire cover being adjustable to adapt to different mounting locations of said microphone housing relative to the mirror assembly.

22. The microphone module of claim 20, wherein the mirror harness is connectable to the vehicle wiring harness via a connector.

23. The microphone module of claim 22, wherein said microphone harness is connectable to the vehicle wiring harness via said connector.

24. The microphone module of claim 20, wherein said microphone harness is connectable to the vehicle wiring harness via a connector.

25. The microphone module of claim 24, wherein said microphone housing is removably attached to a mounting bracket on at least one of the windshield and the headliner.

26. The microphone module of claim 20, wherein said microphone housing is adhesively secured to the windshield.

27. The microphone module of claim 20, wherein said microphone housing is removably attached to a mounting bracket on at least one of the windshield and the headliner.

28. The microphone module of claim 20, wherein said microphone housing includes manual controls for said audio system.

29. The microphone module of claim 20, wherein manual controls for said audio system are positioned on at least one of the mirror assembly and said housing.

30. The microphone module of claim 20, wherein said microphone module includes at least one of a Global Positioning System antenna, a motion sensor, a rain sensor, a video device and an interior light of the vehicle, an automatic toll booth transducer, a security system status indicator, a compass, a compass sensor, a temperature display, a temperature sensor, a tire pressure indicator display, a seat occupancy detection antenna, a seat occupancy detection transducer, and a loudspeaker.

31. An accessory module for a vehicle, the vehicle having a cabin, a windshield and a headliner extending along an upper edge of the windshield, said accessory module comprising:

at least two microphones for receiving audio signals from within the cabin, said at least two microphones being electronically connectable to a vehicle wiring within the headliner, said at least two microphones generating output signals indicative of sound generated within the vehicle cabin, said output signals being digitized and integrated in order to distinguish the presence of voice signals versus noise signals, said noise signals originating from at least one noise source selected from the group consisting of engine noise, road noise, wind noise, HVAC noise, a radio, and a turn signal;

a microphone housing for mounting said at least two microphones; and an interior rearview mirror assembly, said mirror assembly including a mirror wiring harness and a mirror housing, said mirror wiring harness being electronically connectable to the vehicle wiring in the headliner, said mirror wiring harness being at least partially routed within said microphone housing, said microphone housing being mountable to the windshield at a location remote from said interior rearview mirror assembly.

32. The accessory module of claim 31, wherein said mirror assembly further includes a mounting button for mounting said mirror assembly to an interior surface of the windshield.

33. The accessory module of claim 32 further including a wire cover which extends between said microphone housing and said mounting button and at least partially encases said mirror wiring harness.

34. The accessory module of claim 32, wherein said mirror harness is a spirally coiled cord extending generally downwardly from said microphone housing to said mirror housing.

35. The accessory module of claim 31, wherein said microphone housing includes a mirror mounting arm extending generally downwardly from said microphone housing, said mirror housing being pivotally interconnected to a lower end of said mirror mounting arm.

36. The accessory module of claim 35, wherein said mirror wiring harness is at least partially encased within said mirror mounting arm.

37. The accessory module of claim 31, wherein said microphone housing is adhesively securable to an interior surface of the windshield.

38. The accessory module of claim 32, wherein said microphone housing is removably mountable to a mounting member.

39. The accessory module of claim 38, wherein said mounting member is adhesively securable to the windshield.

40. The accessory module of claim 38, wherein said mounting member is securable within the headliner of the vehicle.

41. The accessory module of claim 38 further including a connector for electrical connection with the vehicle wiring.

42. The accessory module of claim 41, wherein said mirror harness is connected to said connector.

43. The accessory module of claim 42, wherein said microphone harness is connected to said connector.

44. The accessory module of claim 41, wherein said microphone harness is connected to said connector.

45. The microphone module of claim 1 including a control which is operable to digitize individual output signals from said plurality of microphones and determine which output signals are the loudest and which have the presence of voice signals verses noise signals, said control being further operable to select signals of individual microphones in response to said individual output signals.

46. The microphone module of claim 6, wherein said wire cover comprises an adjustable wire cover, said wire cover being adjustable to adapt to different mounting locations of said microphone module relative to the rearview mirror.

47. The microphone module of claim 20, wherein said module is operable to determine which of said microphones are receiving voice signals and which are receiving non-voice signals, said module at least partially filtering out the non-voice signals.

48. The microphone module of claim 47 including a control which is operable to digitize individual outputs from said plurality of microphones and determine which outputs are the loudest and which have the presence of voice signals verses non-voice signals, said control being further operable to select signals of individual microphones in response to the individual outputs.

49. The microphone module of claim 47, wherein at least one of said microphones is fixedly mounted and directed toward an area generally defined by a typical location of a head of a driver of the vehicle.

50. The accessory module of claim 31, wherein said module is operable to determine which of said microphones are receiving voice signals and which are receiving non-voice signals, said module at least partially filtering out the non-voice signals.

51. The accessory module of claim 50 including a control which is operable to digitize individual outputs from said at least two microphones and determine which outputs are the loudest and which have the presence of voice signals verses non-voice signals, said control being further operable to select signals of individual microphones in response to the individual outputs.

52. The accessory module of claim 50, wherein at least one of said microphones is fixedly mounted and directed toward an area generally defined by a typical location of a head of a driver of the vehicle.

53. The accessory module of claim 33, wherein said wire cover comprises an adjustable wire cover, said wire cover being adjustable to adapt to different mounting locations of said microphone housing relative to said interior rearview mirror assembly.

54. A voice acquisition system for an audio system of a vehicle, the vehicle having a cabin, a windshield and an interior rearview mirror assembly, said voice acquisition system comprising:

a plurality of microphones for receiving audio signals from within the cabin, said plurality of microphones comprising at least two microphones which generate output signals indicative of sound generated within the vehicle cabin, at least one of said at least two microphones being directed toward an area encompassing the general location of a head of a driver of the vehicle, said at least two microphones being one of (i) positioned within the interior rearview mirror assembly, (ii) positioned adjacent to the interior rearview mirror assembly, (iii) positioned in an attachment to the interior rearview mirror assembly, and (iv) positioned within a module mounted to the windshield; and a control which is operable to digitize and integrate said output signals in order to distinguish the presence of vocal signals versus non-vocal signals and to at least partially filter out said non-vocal signals, said non-vocal signals originating from at least one noise source selected from the group consisting of engine noise, road noise, wind noise, HVAC noise, a radio, and a turn signal.

55. The voice acquisition system of claim 54, wherein said control is operable to select at least one of said output signals from at least one of said microphones and to provide the at least one selected output signal to the audio system.

56. The voice acquisition system of claim 54, wherein at least one of said microphones is a single directional microphone and is fixedly mounted and directed toward the area generally defined by a typical location of a head of a driver of the vehicle.

57. The voice acquisition system of claim 54, wherein said at least two microphones are positioned within said module mounted to the windshield, said module being positioned between the interior rearview mirror assembly and a headliner extending along an upper edge of the windshield.

58. The voice acquisition system of claim 57, wherein said module includes a wire cover extending between said module and the interior rearview mirror assembly, the interior rearview mirror assembly including a mirror harness which is routed within the wire cover.

59. The voice acquisition system of claim 58, wherein the wire cover comprises an adjustable wire cover, the wire cover being adjustable to adapt to different mounting locations of said module relative to the interior rearview mirror assembly.

60. The voice acquisition system of claim 57 further including control switches for the audio system.

61. The voice acquisition system of claim 54, wherein said at least two microphones are positioned within a module.

62. The voice acquisition system of claim 61, wherein said module further includes at least one of a Global Positioning System antenna, a motion sensor, a rain sensor, a video device an interior light of the vehicle, an automatic toll booth transducer, a security system status indicator, a compass, a compass sensor, a temperature display, a temperature sensor, a tire pressure indicator display, a seat occupancy detection antenna, a seat occupancy detection transducer, and a loudspeaker.

63. The voice acquisition system of claim 54 further including at least one accessory selected from the group consisting of a Global Positioning System antenna, a motion sensor, a rain sensor, a video device, an interior light of the vehicle, an automatic toll booth transducer, a security system status indicator, a compass, a compass sensor, a temperature display, a temperature sensor, a tire pressure indicator display, a seat occupancy detection antenna, a seat occupancy detection transducer, and a loudspeaker.

64. The voice acquisition system of claim 63, wherein said accessory is one of (i) positioned within the interior rearview mirror assembly, (ii) positioned adjacent to the interior rearview mirror assembly, (iii) positioned in an attachment to the interior rearview mirror assembly, and (iv) positioned within a module mounted to the windshield.

65. The voice acquisition system of claim 54, wherein the audio system comprises one of a cellular telephone system, an emergency communication system and a voice recording system.

* * * * *

UNITED STATES PATENT AND TRADEMARK OFFICE
CERTIFICATE OF CORRECTION

PATENT NO. : 6,243,003 B1
DATED : June 5, 2001
INVENTOR(S) : Jonathan E. DeLine, Niall R. Lynam and Ralph A. Spooner It is certified that error appears in the above-identified patent and that said Letters Patent is hereby corrected as shown below:

<u>Column 11,</u>
Line 2, "croup" should be -- group --

Signed and Sealed this

Twenty-fifth Day of March, 2003

JAMES E. ROGAN
*Director of the United States Patent and Trademark Office*